US012573658B2

(12) United States Patent
Hayakawa et al.

(10) Patent No.:  US 12,573,658 B2
(45) Date of Patent:       Mar. 10, 2026

(54) SOLID-STATE BATTERY AND METHOD OF MANUFACTURING SOLID-STATE BATTERY

(71) Applicant: Murata Manufacturing Co., Ltd., Nagaokakyo (JP)

(72) Inventors: Takahiro Hayakawa, Nagaokakyo (JP); Keisuke Shimizu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 540 days.

(21) Appl. No.: 18/321,382

(22) Filed: May 22, 2023

(65) Prior Publication Data

US 2023/0299339 A1      Sep. 21, 2023

Related U.S. Application Data

(63) Continuation of application No. PCT/JP2021/043497, filed on Nov. 26, 2021.

(30) Foreign Application Priority Data

Nov. 27, 2020      (JP) ................................. 2020-197322

(51) Int. Cl.
H01M 10/0562 (2010.01)
H01M 10/052 (2010.01)
(Continued)

(52) U.S. Cl.
CPC ..... H01M 10/0562 (2013.01); H01M 10/058 (2013.01); H01M 10/0585 (2013.01);
(Continued)

(58) Field of Classification Search
None
See application file for complete search history.

(56) References Cited

U.S. PATENT DOCUMENTS

2016/0013513 A1 *   1/2016   Gaben ................. H01M 4/1391
                                                              156/151
2019/0288246 A1     9/2019   Kato et al.
(Continued)

FOREIGN PATENT DOCUMENTS

JP          2006261008 A       9/2006
JP          2015220099 A       12/2015
(Continued)

OTHER PUBLICATIONS

International Search Report in PCT/JP2021/043497, mailed Dec. 28, 2021, 6 pages.

*Primary Examiner* — Jonathan Crepeau
(74) *Attorney, Agent, or Firm* — ArentFox Schiff LLP

(57) ABSTRACT
A solid state battery that includes: a battery element including a positive electrode layer, a negative electrode layer, and a solid electrolyte layer interposed between the positive electrode layer and the negative electrode layer; an end-face electrode facing the end surface of the battery element; a covering layer covering the battery element with the end-face electrode; and an insulating buffer layer between the covering layer and the battery element and surrounding the battery element, wherein the insulating buffer layer is also sandwiched between the battery element and the end-face electrode and arranged intermittently on an end-face electrode facing region side of the end surface of the battery element.

20 Claims, 3 Drawing Sheets

(51) Int. Cl.

| | | |
|---|---|---|
| *H01M 10/058* | (2010.01) | |
| *H01M 10/0585* | (2010.01) | |
| *H01M 50/103* | (2021.01) | |
| *H01M 50/11* | (2021.01) | |
| *H01M 50/117* | (2021.01) | |
| *H01M 50/24* | (2021.01) | |
| *H01M 50/531* | (2021.01) | |

(52) U.S. Cl.

CPC ......... *H01M 50/103* (2021.01); *H01M 50/11*
(2021.01); *H01M 50/117* (2021.01); *H01M 50/24* (2021.01); *H01M 50/531* (2021.01);
*H01M 10/052* (2013.01)

(56) References Cited

U.S. PATENT DOCUMENTS

| | | | |
|---|---|---|---|
| 2020/0350613 A1 | 11/2020 | Kato et al. | |
| 2021/0249696 A1 | 8/2021 | Maniwa et al. | |
| 2022/0006127 A1* | 1/2022 | Nakano | H01M 10/0525 |
| 2022/0209378 A1* | 6/2022 | Koyama | H01M 10/0562 |

FOREIGN PATENT DOCUMENTS

| | | | |
|---|---|---|---|
| JP | 2018049839 A | 3/2018 | |
| WO | 2018123319 A1 | 7/2018 | |
| WO | 2018163514 A1 | 9/2018 | |
| WO | 2019164006 A1 | 8/2019 | |
| WO | 2020090736 A1 | 5/2020 | |
| WO | 2020202928 A1 | 10/2020 | |

* cited by examiner

SOLID-STATE BATTERY AND METHOD OF MANUFACTURING SOLID-STATE BATTERY

CROSS REFERENCE TO RELATED APPLICATIONS

The present application is a continuation of International application No. PCT/JP2021/043497, filed Nov. 26, 2021, which claims priority to Japanese Patent Application No. 2020-197322, filed Nov. 27, 2020, the entire contents of each of which are incorporated herein by reference.

FIELD OF THE INVENTION

The present invention relates to a solid state battery and a method of manufacturing a solid state battery.

BACKGROUND OF THE INVENTION

Conventionally, secondary batteries that can be repeatedly charged and discharged have been used for various purposes. For example, secondary batteries are used as power supplies for electronic devices such as smart phones and notebook computers.

In the secondary batteries, liquid electrolytes (electrolytic solutions) such as organic solvents have been conventionally used as media for moving ions. The secondary batteries with the electrolytic solutions used have, however, problems such as leakages of the electrolytic solutions. Therefore, the development of solid state batteries including a solid electrolyte instead of a liquid electrolyte has been advanced.

Patent Document 1: Japanese Patent Application Laid-Open No. 2018-49839

SUMMARY OF THE INVENTION

As a solid state battery, there is a battery element including: a positive electrode layer and a negative electrode layer that face each other, and a solid electrolyte layer interposed between the positive electrode layer and the negative electrode layer; an exterior that surrounds the surface of the battery element; and a lubricant between the battery element and the exterior (see Patent Document 1). Such a lubricant may be provided between the whole peripheral surface of the battery element and the inner surface of the exterior facing the whole peripheral surface.

In this regard, the inventors of the present application have found matters to be further improved in the solid state battery mentioned above. Specifically, in the case of providing an end-face electrode on the end surface of the battery element, the lubricant is also provided between the battery element and the end-face electrode when the whole peripheral surface of the battery element has the lubricant. Thus, the presence of the lubricant may make the electrode layer of the battery element and the end-face electrode less likely to come into contact with each other. In addition, the electrode layer (positive electrode layer/negative electrode layer) may expand and shrink at the time of charging and discharging the solid state battery, such expansion and shrinkage may cause the exterior to be peeled off from the battery element with the end-face electrode, thereby damaging the end surface of the battery element.

The present invention has been made in view of such circumstances. More specifically, a main object of the present invention is to provide a solid state battery that allows for achieving a balance between contact secured between an electrode layer and an end-face electrode and suppressed generation of damage to the end surface of a battery element.

For achieving the object mentioned above, an embodiment of the present invention provides a solid state battery including: a battery element including a positive electrode layer, a negative electrode layer, and a solid electrolyte layer interposed between the positive electrode layer and the negative electrode layer; an end-face electrode facing an end surface of the battery element; a covering layer covering the battery element with the end-face electrode; and an insulating buffer layer between the covering layer and the battery element and surrounding the battery element, where the insulating buffer layer is also sandwiched between the battery element and the end-face electrode and arranged intermittently on an end-face electrode facing region side of the end surface of the battery element.

For achieving the object mentioned above, an embodiment of the present invention provides a method for manufacturing a solid state battery, including: stacking a positive electrode layer sheet, a solid electrolyte layer sheet, and a negative electrode layer sheet in a stacking direction to form an unfired stacked body; providing an insulating material intermittently on a surface of the unfired stacked body; firing the unfired stacked body with the insulating material to form a fired laminated body; providing an end-face electrode on a surface of the fired laminated body having the intermittent insulating material; and forming a covering layer to cover the fired laminated body with the end-face electrode.

According to an embodiment of the present invention, it is possible to achieve a balance between the contact secured between the electrode layer and the end-face electrode and the suppressed generation of damage to the end surface of the battery element.

DETAILED DESCRIPTION OF THE INVENTION

Figure 1:
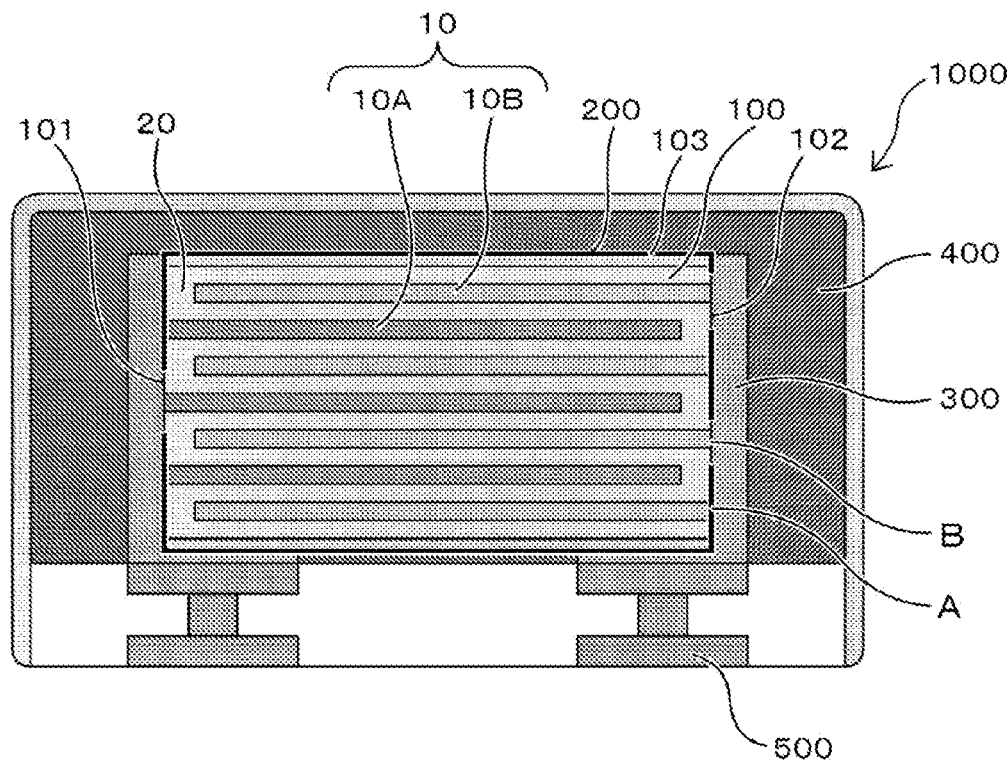
FIG. 1 is a sectional view schematically illustrating a solid state battery according to an embodiment of the present invention as viewed from a direction of a section X-X' in FIG. 2.

Before describing a solid state battery according to an embodiment of the present invention, the basic configuration of the solid state battery will be described. The term "solid state battery" used in the present specification refers, in a broad sense, to a battery that has constituent elements composed of solids, and in a narrow sense, to an all-solid state battery that has constituent elements (in particular, all constituent elements) composed of solids. According to a preferred aspect, a solid state battery according to the present invention is a stacked solid state battery configured such that respective layers constituting a battery constituent unit are stacked on each other, and preferably, such layers are each composed of a sintered body. The "solid state battery" used in the present specification can encompass not only a secondary battery that can be repeatedly charged and discharged, but also a primary battery that can be only discharged. According to a preferred aspect of the present invention, the solid state battery is a secondary battery. The "secondary battery" is not to be considered excessively restricted by its name, which can encompass, for example, a power storage device and the like.

The term "sectional view" used in the present specification refers to a solid state battery as viewed from a direction substantially perpendicular to a thickness direction based on the stacking direction of material layers constituting the solid state battery. The "vertical direction" and "horizontal direction" used directly or indirectly in the present specification respectively correspond to the vertical direction and horizontal direction in the drawings. Unless otherwise specified, the same symbols or signs shall denote the same members or sites or the same meanings. According to a preferred aspect, it can be understood that a downward direction in a vertical direction (that is, a direction in which gravity acts) corresponds to a "downward direction", whereas the opposite direction corresponds to an "upward direction".

The various numerical ranges mentioned in the present specification are intended to include the lower and upper numerical values themselves, unless otherwise stated. More specifically, for example, to take a numerical range such as 1 to 10 as an example, unless otherwise stated, the range can be construed as including not only the lower limit of "1" but also the upper limit of "10".

[Configuration of Solid State Battery]

The solid state battery includes at least electrode layers of a positive electrode and a negative electrode, and a solid electrolyte. Specifically, the solid state battery includes a battery element, an end-face electrode, and a covering layer. The battery element includes a battery constituent unit including a positive electrode layer, a negative electrode layer, and a solid electrolyte interposed therebetween. The end-face electrode is an electrode provided to face an end surface of the battery element. The covering layer is provided so as to cover the battery element with the end-face electrode.

For the solid state battery, each layer constituting the solid state battery is formed by firing, and the positive electrode layer, the negative electrode layer, the solid electrolyte, and the like form a sintered layer. Preferably, the positive electrode layer, the negative electrode layer, and the solid electrolyte are integrally fired with each other, and thus, the battery element forms an integrally sintered body.

The positive electrode layer is an electrode layer containing at least a positive electrode active material. The positive electrode layer may further contain a solid electrolyte. For example, the positive electrode layer is composed of a sintered body including at least positive electrode active material particles and solid electrolyte particles. According to a preferred aspect, the positive electrode layer is composed of a sintered body substantially including only positive electrode active material particles and solid electrolyte particles. In contrast, the negative electrode layer is an electrode layer containing at least a negative electrode active material. The negative electrode layer may further contain a solid electrolyte. For example, the negative electrode layer is composed of a sintered body including at least negative electrode active material particles and solid electrolyte particles. According to a preferred aspect, the negative electrode layer is composed of a sintered body substantially including only negative electrode active material particles and solid electrolyte particles.

The positive electrode active material and the negative electrode active material are substances involved in the transfer of electrons in the solid state battery. Ions move (conduct) between the positive electrode layer and the negative electrode layer through the solid electrolyte to transfer electrons, thereby charging and discharging the battery. The positive electrode layer and the negative electrode layer are preferably layers capable of occluding and releasing lithium ions or sodium ions, in particular. More specifically, the solid state battery is preferably an all-solid state secondary battery configured to be charged and discharged by the movement of lithium ions between the positive electrode layer and the negative electrode layer through the solid electrolyte.

(Positive Electrode Active Material)

Examples of the positive electrode active material included in the positive electrode layer include at least one selected from the group consisting of lithium-containing phosphate compounds that have a NASICON-type structure, lithium-containing phosphate compounds that have an olivine-type structure, lithium-containing layered oxides, lithium-containing oxides that have a spinel-type structure, and the like. Examples of the lithium-containing phosphate compounds that have a NASICON-type structure include $Li_3V_2(PO_4)_3$. Examples of the lithium-containing phosphate compounds that have an olivine-type structure include $LiFePO_4$ and $LiMnPO_4$. Examples of the lithium-containing layered oxides include $LiCoO_2$ and $LiCo_{1/3}Ni_{1/3}Mn_{1/3}O_2$. Examples of the lithium-containing oxides that have a spinel-type structure include $LiMn_2O_4$ and $LiNi_{0.5}Mn_{1.5}O_4$. The types of the lithium compounds are not particularly limited, and may be regarded as, for example, a lithium-transition metal composite oxide and a lithium-transition metal phosphate compound. The lithium-transition metal composite oxide is a generic term for oxides containing lithium and one or two or more transition metal elements as constituent elements, and the lithium transition metal phosphate compound is a generic term for phosphate compounds containing lithium and one or two or more transition metal elements as constituent elements. The types of transition metal elements are not particularly limited and are, for example, cobalt (Co), nickel (Ni), manganese (Mn), iron (Fe), and the like.

In addition, examples of positive electrode active materials capable of occluding and releasing sodium ions include at least one selected from the group consisting of sodium-containing phosphate compounds that have a NASICON-type structure, sodium-containing phosphate compounds that have an olivine-type structure, sodium-containing layered oxides, sodium-containing oxides that have a spinel-type structure, and the like. For example, in the case of the sodium-containing phosphate compounds, examples thereof include at least one selected from the group consisting of $Na_3V_2(PO_4)_3$, $NaCoFe_2(PO_4)_3$, $Na_2Ni_2Fe(PO_4)_3$, $Na_3Fe_2(PO_4)_3$, $Na_2FeP_2O_7$, $Na_4Fe_3(PO_4)_2(P_2O_7)$, and $NaFeO_2$ as a sodium-containing layered oxide.

In addition, the positive electrode active material may be, for example, an oxide, a disulfide, a chalcogenide, a conductive polymer, or the like. The oxide may be, for example, a titanium oxide, a vanadium oxide, a manganese dioxide, or the like. The disulfide is, for example, a titanium disulfide, a molybdenum sulfide, or the like. The chalcogenide may be, for example, a niobium selenide or the like. The conductive polymer may be, for example, a disulfide, a polypyrrole, a polyaniline, a polythiophene, a poly-para-styrene, a poly-acetylene, a polyacene, or the like.

(Negative Electrode Active Material)

Specific examples of the negative electrode active material included in the negative electrode layer include at least one selected from the group consisting of oxides containing at least one element selected from the group consisting of Ti, Si, Sn, Cr, Fe, Nb, and Mo, graphite-lithium compounds, lithium alloys, lithium-containing phosphate compounds that have a NASICON-type structure, lithium-containing phosphate compounds that have an olivine-type structure, and lithium-containing oxides that have a spinel-type structure. Examples of the lithium alloys include Li—Al. Examples of the lithium-containing phosphate compounds that have a NASICON-type structure include $Li_3V_2(PO_4)_3$ and $LiTi_2(PO_4)_3$. Examples of the lithium-containing phosphate compounds that have an olivine-type structure include $LiCuPO_4$. Examples of the lithium-containing oxides that have a spinel-type structure include $Li_4Ti_5O_{12}$.

In addition, examples of negative electrode active materials capable of occluding and releasing sodium ions include at least one selected from the group consisting of sodium-containing phosphate compounds that have a NASICON-type structure, sodium-containing phosphate compounds that have an olivine-type structure, and sodium-containing oxides that have a spinel-type structure.

Further, in the solid state battery according to the present invention according to a preferred aspect, the positive electrode layer and the negative electrode layer are made of the same material.

The positive electrode layer and/or the negative electrode layer may include a conductive aid. Examples of the conductive aid included in the positive electrode layer and the negative electrode layer include at least one of metal materials such as silver, palladium, gold, platinum, aluminum, copper, and nickel, and carbon. Although not particularly limited, carbon is preferred in that carbon hardly reacts with the positive electrode active material, the negative electrode active material, the solid electrolyte material, or the like, and produces the effect of reducing the internal resistance of the solid state battery.

Further, the positive electrode layer and/or the negative electrode layer may include a sintering aid. Examples of the sintering aid include at least one selected from the group consisting of a lithium oxide, a sodium oxide, a potassium oxide, a boron oxide, a silicon oxide, a bismuth oxide, and a phosphorus oxide.

(Solid Electrolyte)

The solid electrolyte is a material capable of lithium-ion conduction. In particular, the solid electrolyte constituting a battery constituent unit in the solid state battery forms a layer capable of lithium-ion or sodium-ion conduction between the positive electrode layer and the negative electrode layer. It is to be noted that the solid electrolyte has only to be provided at least between the positive electrode layer and the negative electrode layer. More specifically, the solid electrolyte may be present around the positive electrode layer and/or the negative electrode layer so as to protrude from between the positive electrode layer and the negative electrode layer. Specific examples of the solid electrolyte include lithium-containing phosphate compounds that have a NASICON structure, oxides that have a perovskite structure, oxides that have a garnet-type or garnet-type similar structure, and oxide glass ceramic-based lithium ion conductors. Examples of the lithium-containing phosphate compounds that have a NASICON structure include $Li_xM_y(PO_4)_3$ ($1 \leq x \leq 2$, $1 \leq y \leq 2$, and M is at least one selected from the group consisting of Ti, Ge, Al, Ga, and Zr). Examples of the lithium-containing phosphate compounds that have a NASICON structure include $Li_{1.2}Al_{0.2}Ti_{1.8}(PO_4)_3$. Examples of the oxides that have a perovskite structure include $La_{0.55}Li_{0.35}TiO_3$. Examples of the oxides that have a garnet-type or garnet-type similar structure include $Li_7La_3Zr_2O_{12}$. For example, phosphate compounds (LATP) containing lithium, aluminum, and titanium as constituent elements, and phosphate compounds (LAGP) containing lithium, aluminum, and germanium as constituent elements can be used as the oxide glass ceramic-based lithium ion conductors.

Further, examples of the solid electrolyte capable of sodium-ion conduction include sodium-containing phosphate compounds that have a NASICON structure, oxides that have a perovskite structure, and oxides that have a garnet-type or garnet-type similar structure. Examples of the sodium-containing phosphate compounds that have a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte may include a sintering aid. The sintering aid included in the solid electrolyte may be selected from, for example, the same materials as the sintering aids, which can be included in the positive electrode layer/the negative electrode layer.

(End Face Electrode)

The solid state battery is generally provided with an end-face electrode. Specifically, the end-face electrode is provided so as to face an end surface of the battery element. Specifically, a positive-electrode-side end-face electrode connected to the positive electrode layer and a negative-electrode-side end-face electrode connected to the negative electrode layer are provided respectively on mutually facing end-surface regions of the battery element. More specifically, the positive-electrode-side end-face electrode is configured to be joinable to an end of the positive electrode layer, specifically, an extended part formed at the end of the positive electrode layer. In addition, the negative-electrode-side end-face electrode is configured to be joinable to an end of the negative electrode layer, specifically, an extended part formed at the end of the negative electrode layer.

In a preferred aspect, the end-face electrodes preferably contain glass or glass ceramics from the viewpoint of joining the end-face electrodes to the extended parts of the electrode layers. In addition, the end-surface electrodes preferably contain a material that is high in conductivity. The specific materials of the end-face electrodes are to be considered not particularly limited, but examples thereof include at least one selected from the group consisting of silver, gold, platinum, aluminum, copper, tin, and nickel. The use of a metal material for the end-face electrode materials can suppress entry of moisture from the end-face electrodes. The thicknesses of the end-surface electrodes are not particularly limited, and may be, for example, 0.01 μm to 1 mm, and particularly 1 μm to 100 μm.

(Lower Surface Electrode)

The solid state battery may further include a lower surface electrode connected to the end-face electrode mentioned above on the lower-surface side of the battery element. The lower surface electrode can be configured such that one end thereof is connected to the end-face electrode, whereas the other end thereof is exposed to the outside from the surface of the solid state battery. In this case, the solid state battery can be mounted on an electronic substrate with the lower surface electrode interposed therebetween. The lower surface electrode preferably contains a material that is high in conductivity. The specific material of the lower surface electrode is not particularly limited, and examples thereof can include, from the viewpoint of conductivity, the materials as the conductive metals exemplified as the specific materials of the end-face electrodes. The use of a metal material for the lower surface electrode materials can suppress entry of moisture from the lower surface electrode.

(Covering Layer)

The covering layer includes at least one barrier layer. The covering layer preferably further includes one or more layers selected from the group consisting of a buffer layer and an impact resistant layer. The covering layer is provided so as to cover the battery element with the end-face electrodes as described above. Specifically, the covering layer is provided so as to cover the battery element with the end-electrodes, excluding the connection to the lower surface electrode. In addition, the covering layer is provided so as to cover the surface of the battery element with the end-surface electrodes such that the extended parts of the electrode layers are joinable to the end-face electrodes. More specifically, the covering layer is provided not on the inner surfaces of the end-face electrodes facing the battery element, but on the outer surfaces of the end-face electrodes, at the sites with the end-face electrodes disposed. In such a configuration, the barrier layer included in the covering layer has the function of preventing permeation of gas such as water vapor as described later, and as a result, entry of gas such as water vapor can be thus prevented.

When the covering layer includes an impact resistant layer, the impact resistant layer is preferably disposed for the outermost layer from the viewpoint of impact resistance from the outside and reduction of distortion as a device. In addition, alternately providing the buffer layer and the barrier layer also has the effect of achieving further flexibility and the effect of preventing pinholes, thereby allowing the prevention of water vapor permeation to be improved. In other words, disposing the buffer layer adjacent to the barrier layer can produce the effect of achieving further flexibility and the effect of preventing pinholes.

The barrier layer is a layer for preventing permeation of gas such as water vapor. The thickness of the barrier layer can be, for example, 10 nm to 100 μm, preferably 100 nm to 10 μm. The barrier layer has a water vapor permeation rate of $1.0 \times 10^{-2}$ g/(m²·Day) or less, preferably $1 \times 10^{-4}$ g/(m²·Day) to $8 \times 10^{-3}$ g/(m²·Day), more preferably $1 \times 10^{-4}$ g/(m²·Day) to $8 \times 10^{-4}$ g/(m²·Day). The water vapor permeation rate of the barrier layer is, for example, $4 \times 10^{\times 4}$ g/(m²·Day).

When the covering layer includes two or more barrier layers, the water vapor permeation rates of the two or more barrier layers may each independently fall within the range mentioned above. In the present specification, the "water vapor permeation rate" refers to a permeation rate obtained with the use of a gas permeation rate measurement system of model GTms-1 manufactured by ADVANCE RIKO, Inc. under the measurement conditions of 40° C. and 90% RH, and differential pressure: 1 atm.

The barrier layer may have non-conductivity. Specifically, the barrier layer has a surface resistivity of $1.0 \times 10^6$ Ω/sq. or more, preferably $1.0 \times 10^8$ Ω/sq. or more. When the covering layer includes two or more barrier layers, the surface resistivities of the two or more barrier layers may each independently fall within the range mentioned above. In the present specification, the "surface resistivity" refers to a value obtained by measuring a sample of 0.1 mm in thickness at 25° C. with MCP-HT450 manufactured by Mitsubishi Chemical Analytech Co., Ltd.

The barrier layer is desirably a layer that prevents permeation of alkali metal ions such as Li ions in consideration of an influence on external semiconductor components. Examples of the material constituting such a barrier layer include a nitride film and an oxynitride film. The nitride film and the oxynitride film are preferably made of silicon or aluminum, and the nitride film and the oxynitride film are more preferably respectively a silicon nitride ($SiN_t$) and a silicon oxynitride ($SiN_tO_u$) (t and u are numerical values that are larger than 0). Preferred is a silicon oxynitride film from the viewpoint of preventing peeling and cracking due to a deformation by an external force.

The barrier layer is more preferably a silicon oxynitride film such that the refractive index of light is 1.7 or more (particularly 1.7 to 2.0) with the ratio of oxygen kept low (the value of u set to be low). The barrier layer can be covered with a ceramic material such as low-melting-point glass or a Claist that is a viscosity material as another material constituting the barrier layer. The low-melting-point glass is bismuth, lead, boron, or vanadium-based glass, which refers to a material that has a glass transition point of 500° C. or lower. The Claist is a clay-like layered compound, and has a water vapor permeation rate of $1.0 \times 10^{-2}$ g/(m²·Day) or less, preferably $1 \times 10^{-4}$ g/(m²·Day) or more, and $8 \times 10^{-3}$ g/(m²·Day) or less, more preferably $1 \times 10^{-4}$ g/(m²·Day) or more, and $8 \times 10^{-4}$ g/(m²·Day) or less.

The buffer layer is a layer for causing the covering layer to follow the expansion and shrinkage of the solid state battery at the time of charging and discharging the solid state battery, which is a layer for preventing destruction of the barrier layer. Disposing the buffer layer in direct contact with the barrier layer makes it possible to cause the covering layer to follow the expansion and shrinkage at the time of charging and discharging while preventing destruction of the barrier layer, and as a result, gas barrier properties can be obtained over a more sufficiently long period of time.

The buffer layer may have non-conductivity. Specifically, the buffer layer may have a surface resistivity within the same range as that of the barrier layer. When the covering layer includes two or more buffer layers, the surface resistivities of the two or more buffer layers may each independently fall within the range mentioned above.

The constituent material of the buffer layer is not particularly limited as long as the buffer layer itself is a material capable of following the expansion and shrinkage of the solid state battery at the time of charging and discharging the solid state battery. Examples of the constituent material of the buffer layer include polyimide resins, polyimide silicone resins, silicone resins, polyamide resins, epoxy resins, and rubbers. The thickness of the buffer layer may be typically, for example, 1 μm to 1 mm, particularly 10 μm to 500 μm.

The impact resistant layer is a layer for preventing breakages due to a thermal shock at the time of mounting the solid state battery by reflow and a physical shock at the time of handling the solid state battery. Disposing the impact resistant layer as the outermost layer makes it possible to cause the covering layer to follow the expansion and shrinkage at the time of charging and discharging while preventing destruction of the barrier layer, and as a result, gas barrier properties can be obtained over a more sufficiently long period of time.

The impact resistant layer may have non-conductivity. Specifically, the impact resistant layer may have a surface resistivity within the same range as that of the barrier layer. The constituent material of the impact resistant layer is not particularly limited, and examples thereof include a mold resin including a resin and a filler. Examples of the resin include the same resins exemplified as the constituent material of the buffer layer. Examples of the filler include silica, alumina, SiC (silicon carbide), and BN (boron nitride). A preferred constituent material for the impact resistant layer is an epoxy resin mixed with silica. The thickness of the impact resistant layer is adjusted to be such a thickness that can keep swelling by 10% or less with respect to the expansion displacement in charging the solid state battery. The thickness of the impact resistant layer may be, for example, 1 μm to 1 mm, particularly 10 μm to 500 μm.

[Feature of Solid State Battery According to Present Invention]

In consideration of the basic configuration of the solid state battery, a feature of a solid state battery according to an embodiment of the present invention will be described below.

The inventors of the present application have intensively studied solutions for allowing a balance to be achieved between the contact secured between the electrode layer and the end-face electrode and the suppressed generation of damage to the end surface of the battery element. As a result of such studies, the inventors of the present application have newly devised further providing an insulating buffer layer between the covering layer (the layer configured to cover the battery element with the end-face electrodes) and the battery element, and characterizing an aspect of disposing the insulating buffer layer.

Specifically, the inventors of the present application have newly devised the present invention, based on a technical idea that "the insulating buffer layer positioned between the battery element and the end-face electrodes is intentionally not formed over the whole region where the battery element and the end-face electrodes face each other".

The term "end-face electrode provided so as to face the end surface of the battery element" used in the present specification refers to an end-face electrode that faces the end surface of the battery element at a distance from the end surface, with an interposed member (corresponding to the insulating buffer layer) interposed therebetween. The term "covering layer provided so as to cover the battery element with the end-face electrodes" used in the present specification refers to a covering layer configured to cover both (1) the surfaces of the end-face electrodes disposed on the battery element and (2) the surface of the battery element without any end-face electrode disposed.

The term "insulating buffer layer" used in the present specification refers to a layer that has an insulating property and also has a buffering function. The term "insulating buffer layer located between the covering layer and the battery element and provided so as to surround the battery element" used in the present specification refers, in a broad sense, to an insulating buffer layer sandwiched between the covering layer and the battery element and surrounding the battery element in contact with the battery element, and in a narrow sense, to an insulating buffer layer sandwiched between the covering layer and the battery element, with one main surface always in contact with the battery element and the other main surface in contact with or out of contact with the covering layer in some cases.

The term "end-face electrode facing region of the end surface of the battery element" used in the present specification refers to a region of the end surface of the battery element with the end-face electrodes disposed to face the end surface. The phrase "the insulating buffer layer is sandwiched between the battery element and the end-face electrodes and provided intermittently" used in the present invention refers to, in a broad sense, the fact that the insulating buffer layer is discontinuously provided between the battery element and the end-face electrodes, and in a narrow sense, to the fact that there are a part where the insulating buffer layer is provided and a part where the insulating buffer layer is not provided between the battery element and the end-face electrodes.

Figure 2:
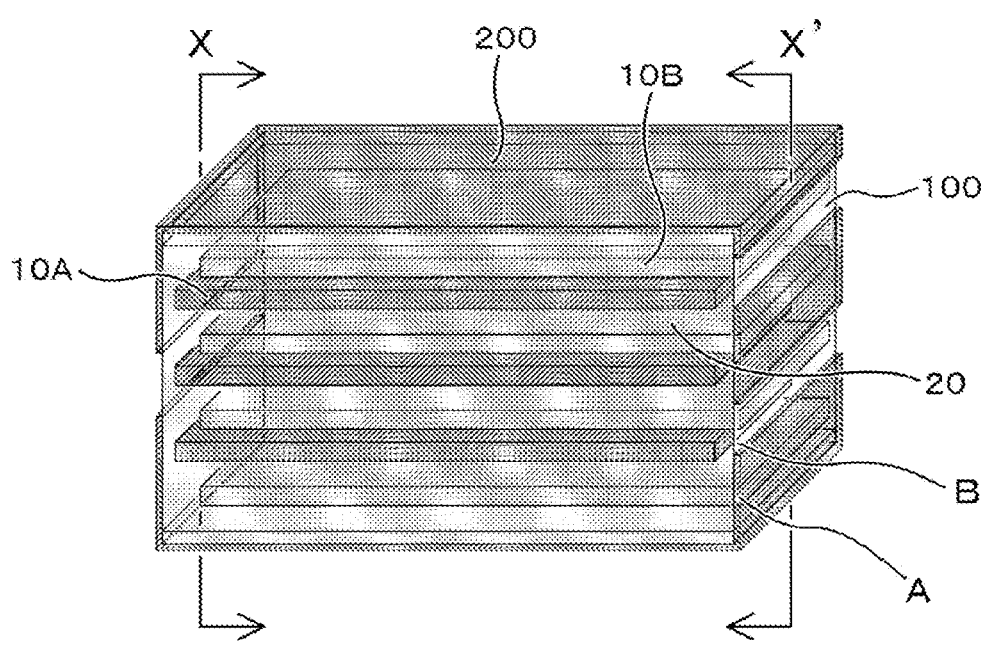
FIG. 2 is a perspective view schematically illustrating a part of the solid state battery according to an embodiment of the present invention.

Hereinafter, a feature of a solid state battery according to an embodiment of the present invention will be specifically described with reference to the drawings. FIG. 1 is a sectional view schematically illustrating a solid state battery according to an embodiment of the present invention as viewed from a direction of a section X-X' in FIG. 2. FIG. 2 is a perspective view schematically illustrating the solid state battery according to an embodiment of the present invention.

As shown in FIGS. 1 and 2, a solid state battery 1000 according to an embodiment of the present invention includes a battery element 100, an end-face electrode 300, a covering layer 400, and a lower surface electrode 500. As described above, the battery element 100 includes a positive electrode layer 10A, a negative electrode layer 10B, and a solid electrolyte layer 20 interposed between the positive electrode layer 10A and the negative electrode layer 10B. The end-face electrode 300 is provided to face an end surface 101 of the battery element 100. The covering layer 400 is provided so as to cover the battery element 100 with the end-face electrode 300. The lower surface electrode 500 is connected to the end-face electrode 300 on the lower-surface side of the battery element 100. The lower surface electrode 500 is configured such that one end thereof is connected to the end-face electrode 300, whereas the other end thereof is exposed to the outside from the surface of the solid state battery 1000.

Furthermore, the solid state battery 1000 according to an embodiment of the present invention further includes an insulating buffer layer 200. The insulating buffer layer 200 is a layer located between the covering layer 400 and the battery element 100 and provided so as to surround the battery element 100.

As an example, as shown in FIGS. 1 and 2, the battery element 100 may have a substantially rectangular parallelepiped shape. In this case, "the insulating buffer layer 200 surrounding the battery element 100" corresponds to a layer configured to directly face the upper surface, lower surface, and side surfaces constituting the end surface 101 of the battery element 100 in a substantially rectangular parallelepiped shape.

As mentioned above, the insulating buffer layer 200 is a layer that has an insulating property and also has a buffering function, and thus, as will be specifically described below, the insulating buffer layer 200 is capable of receiving the expanding and shrinking battery element 100 as a whole, while relaxing the stress caused by the expansion and shrinkage of the battery element 100.

This avoids direct contact between the expanding and shrinking battery element 100 and each of the covering layer 400 and end-face electrode 300. As a result, damage to the end surface of the battery element becomes avoidable. As a result, as a whole, the generation of damage can be suppressed to the end surface 101 of the battery element 100, composed of the upper surface, lower surface, and side surfaces of the battery element 100.

In such a configuration, according to an embodiment of the present invention, based on the technical idea mentioned above, the insulating buffer layer 200 positioned on the side corresponding to an end-face electrode facing region 102 of the battery element 100 is sandwiched between the battery element 100 and the end-face electrode 300 and provided intermittently. This is a technical feature of the present invention.

According to such a technical feature, on the side corresponding to the electrode facing region 102 of the end surface 101 of the battery element 100, the insulating buffer layer 200 is sandwiched between the battery element 100 and the end-face electrode 300 and provided intermittently. Thus, as shown in FIG. 1, (1) a region where the insulating buffer layer 200 is positioned between the battery element 100 and the end-face electrode 300 and (2) a region where the insulating buffer layer 200 is not positioned between the battery element 100 and the end-face electrode 300 are formed on the side corresponding to the end-face electrode facing region 102.

More specifically, in the case of (1) mentioned above, with the insulating buffer layer 200 positioned, a facing region A where the battery element 100 and the insulating buffer layer 200 directly face each other can be formed between the battery element 100 and the end-face electrode 300.

In contrast, in the case of (2) mentioned above, without the insulating buffer layer 200 positioned, a non-facing region B where the battery element 100 and the insulating buffer layer 200 do not face each other can be formed between the battery element 100 and the end-face electrode 300.

In this regard, at the time of charging and discharging the battery, the electrode layer 10 (positive electrode layer 10A/negative electrode layer 10B) can expand and shrink, and accordingly, the battery element 100 with the electrode layer 10 therein can also expand and shrink. The stress caused by such expansion and shrinkage can possibly cause the covering layer 400 to be peeled off from the battery element 100 with the end-face electrode 300, thereby damaging the end surface of the battery element 100. In particular, when attention is paid to, of the surface region of the battery element, the end-face electrode facing region 102 of the battery element 100, the stress caused by the expansion and shrinkage of the battery element 100 may possibly cause the end-face electrode 300 to be peeled off from the battery element 100.

In this regard, in the region A, the battery element 100 and the insulating buffer layer 200 directly face each other between the battery element 100 and the end-face electrode 300. This means that the battery element 100 and the end-face electrode 300 do not directly face each other. This avoids direct contact between the expanding and shrinking battery element 100 the end-face electrode 300 in the region A. In addition, the insulating buffer layer 200 is, because of its buffering property, capable of receiving the expanding and shrinking battery element 100, while relaxing the stress caused by the expansion and shrinkage of the battery element 100 at the time of charging and discharging. More specifically, the insulating buffer layer 200 can function as a "stress relaxing layer" for relaxing the stress caused by the expansion and shrinkage of the battery element 100 at the time of charging and discharging.

From the foregoing, the end-face electrode 300 peeled from the end-face electrode facing region 102 can be suitably avoided. As a result, damage to the end-face electrode facing region 102 of the end surface of the battery element 100 can be suitably avoided.

In the region B, the battery element 100 and the insulating buffer layer 200 do not face each other between the battery element 100 and the end-face electrode 300. This means that the battery element 100 and the end-face electrode 300 directly face each other. In the region B, the end surface of the battery element 100 and the end-face electrode 300 directly face each other, thus allowing the electrode layer 10 and the end-face electrode 300 to directly face each other in the configuration with the electrode layer 10 positioned at the directly facing site.

This allows direct contact between the electrode layer 10, specifically, the extended end of the electrode layer 10, and the end-face electrode 300. As a result, defective contact can be avoided between the extended end of the electrode layer 10 and the end-face electrode 300, thereby allowing for securing an electrical connection line for suitably charging and discharging the solid state battery 1000.

In contrast, a region of the end surface of the battery element 100 other than the end-face electrode facing region 102, that is, an end-face electrode non-facing region 103 of the battery element 100 has no end-face electrode 300, thus allowing the region 103 to face the covering layer 400 with the insulating buffer layer 200 interposed therebetween. In other words, the insulating buffer layer 200 is sandwiched between the end-face electrode non-facing region 103 and the covering layer 400.

The presence of the insulating buffer layer 200 avoids direct contact between the expanding and shrinking battery element 100 and covering layer 400 located in the end-face electrode non-facing region 103. Furthermore, the insulating buffer layer 200 is, because of its buffering property, capable of receiving the expanding and shrinking battery element 100, while relaxing the stress caused by the expansion and shrinkage of the battery element 100 located in the region 103. This allows the covering layer 400 peeled from the end-face electrode non-facing region 103 to be suitably avoided. As a result, damage to the end-face electrode non-facing region 103 of the end surface of the battery element 100 can be also suitably avoided.

From the foregoing, according to an embodiment of the present invention, contact between the electrode layer 10 and the end-face electrode 300 can be also suitably secured while suppressing the generation of damage to the end surface 101 of the battery element 100 as a whole.

Further, the present invention preferably employs the following aspects.

First, according to an aspect, the insulating buffer layer 200 is preferably made of at least one material (corresponding to a solid lubricant) selected from the group consisting of a boron nitride, a molybdenum sulfide, and a tungsten sulfide.

Such a material is a material that has an insulating property, has a heat-resisting temperature of 300 degrees or higher and 900 degrees or lower, and is, also under the high-temperature condition, capable of maintaining a low friction coefficient ($\beta$) of 0.2 or less in the atmosphere without being oxidized. Thus, if the solid state battery 1000 is manufactured through a sintering step under a high-temperature condition (200 degrees) as mentioned below, (1) relaxing the stress caused by the expansion and shrinkage of the battery element 100 and (2) securing insulation between the battery element 100 and the covering layer 400 can be suitably ensured.

According to an aspect, the insulating buffer layer 200 is preferably provided in contact with at least the battery element 100 (see FIG. 1).

As described above, the insulating buffer layer 200 is a layer located between the covering layer 400 and the battery element 100 and provided so as to surround the battery element 100. In this regard, the end surface 101 of the battery element 1200, that is, the contour region that forms the end surface 101 and the insulating buffer layer 200 are preferably brought into direct contact with each other, from the viewpoint of the insulating buffer layer 200, while bending, suitably directly receiving the expanding and shrinking battery element 100.

More specifically, as described above, the end surface 101 of the battery element 100 includes the end-face electrode facing region 102 and the end-face electrode non-facing region 103. The region 102 and the region 103 are preferably both brought into direct contact with the insulating buffer layer 200. Thus, as a whole, the end surface 101 of the expanding and shrinking battery element 100 can be suitably directly received by the insulating buffer layer 200.

Furthermore, in the end-face electrode non-facing region 103, the insulating buffer layer 200 is more preferably configured in contact not only with the battery element 100 but also with the covering layer 400. Specifically, one main surface of the insulating buffer layer 200 and the covering layer 400 are more preferably brought into direct contact with each other in addition to the other main surface of the insulating buffer layer 200 and the end-face electrode non-facing region 103 of the battery element 100 in direct contact with each other.

With such a configuration employed, the insulating buffer layer 200 can directly receive not only the expanding and shrinking battery element 100, but also the covering layer 400. As a result, it is possible to suitably avoid not only the covering layer 400 peeled from the end-face electrode non-facing region 103 due to the expansion and shrinkage of the electrode layer 10, but also external pressing forces, impact forces, and the like transmitted to the covering layer 400, and accordingly, transmitted to the battery element 100.

According to an aspect, the facing region A where the battery element 100 and the insulating buffer layer 200 directly face each other and the non-facing region B where the battery element 100 and the insulating buffer layer 200 do not face each other are preferably alternately formed between the battery element 100 and the end-face electrode 300 (see FIG. 1).

As described above, the presence of the facing region A can suitably avoid the end-face electrode 300 peeled from the end-face electrode facing region 102. The presence of the facing region B allows contact between the end-face electrode facing region 102 of battery element 100 and the end-face electrode 300.

In this regard, when attention is paid to the end-face electrode facing region 102 that is a constituent element of the end surface 101 of the battery element 100, the facing region A where the battery element 100 and the insulating buffer layer 200 directly face each other, which is unevenly distributed in a predetermined region, avoids the peeled end-face electrode 300 in the predetermined region, but makes sufficient contact between the battery element 100 and the end-face electrode 300 less likely to be secured.

In contrast, when attention is paid to the end-face electrode facing region 102 of the battery element 100, the non-facing region B where the battery element 100 and the insulating buffer layer 200 do not face each other, which is unevenly distributed in a predetermined region, suitably secures contact between the battery element 100 and the end-face electrode 300 in the predetermined region, but makes the peeled end-face electrode 300 less likely to be avoided.

In view of the foregoing respects, the facing region A and the non-facing region B are preferably alternately formed as mentioned above. This allows for, when attention is paid to the end-face electrode facing region 102, suitably avoiding the unevenly distribution of "the region where the end-face electrode 300 is likely to be prevented from being peeled off" at a predetermined site, and the unevenly distribution of "the region where the contact between the battery element 100 and the end-face electrode 300 is likely to be secured" at the site other than the predetermined site. This allows a balance to be achieved between "the prevention of the end-face electrode 300 peeled off" and "contact secured between the battery element 100 and the end-face electrode 300".

Figure 3:
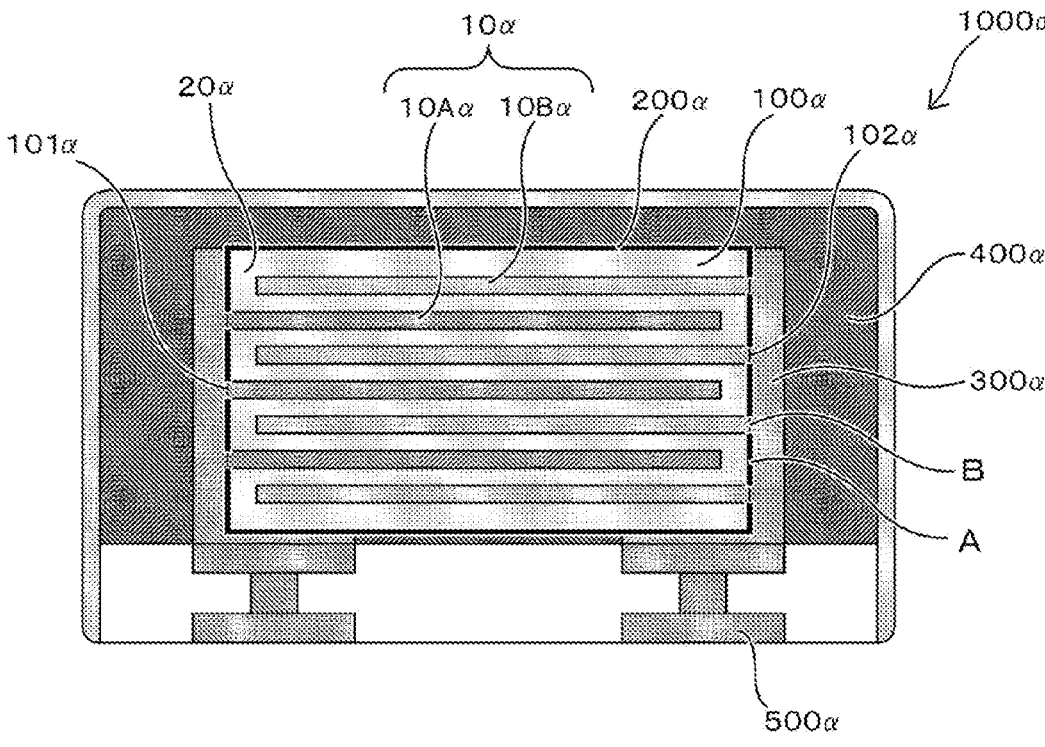
FIG. 3 is a sectional view schematically illustrating a solid state battery according to an embodiment of the present invention as viewed from a direction of a section Y-Y' in FIG. 4.
Figure 4:
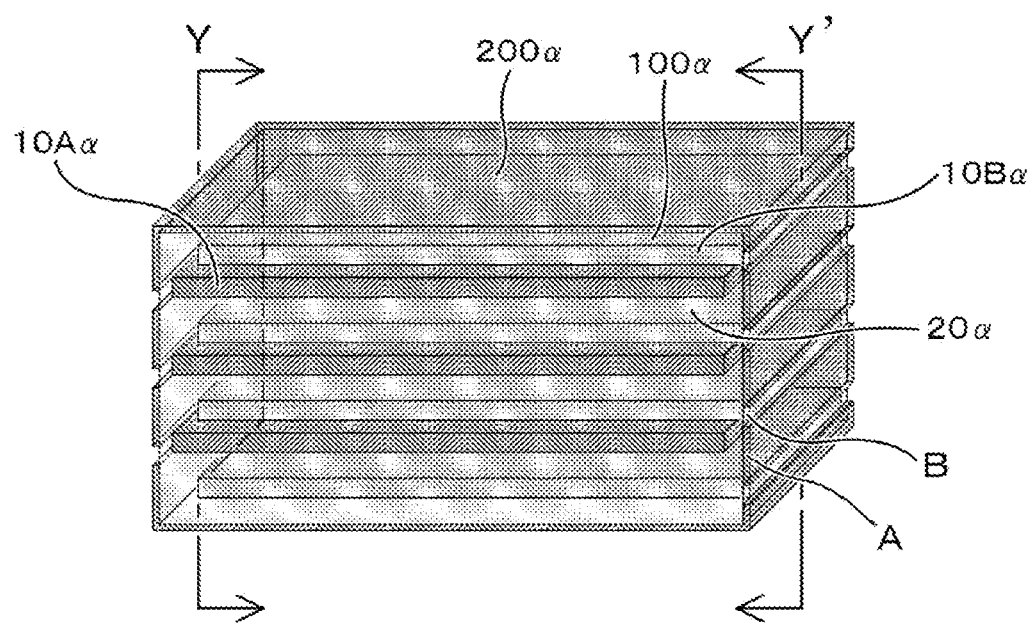
FIG. 4 is a perspective view schematically illustrating a part of the solid state battery according to an embodiment of the present invention.

According to an aspect, in the above-mentioned region B (a non-facing region where a battery element 100α and an insulating buffer layer 200α do not face each other between the battery element 100α and an end-face electrode 300α), only an electrode layer 10α and the end-face electrode 300α directly face each other (see FIGS. 3 and 4).

FIG. 3 is a sectional view schematically illustrating a solid state battery according to an embodiment of the present invention as viewed from a direction of a section Y-Y' in FIG. 4. FIG. 4 is a perspective view schematically illustrating a part of the solid state battery according to an embodiment of the present invention. As described above, the presence of the facing region A can suitably avoid the end-face electrode 300α peeled from an end-face electrode facing region 102α. The presence of the facing region B allows contact between the end-face electrode facing region 102α of battery element 100α and the end-face electrode 300α.

In this regard, in the region B, when not only the electrode layer 10α and the end-face electrode 300α face each other, but also a solid electrolyte layer 20α and the end-face electrode 300α face each other, the part where the solid electrolyte layer 20α and the end-face electrode 300α face each other can serve as a part that makes substantially no contribution as an electrical connection line for charging and discharging the solid state battery 1000α. Thus, as long as the region B employs an embodiment in which only the electrode layer 10α and the end-face electrode 300α directly face each other, the part that makes no contribution can be substantially eliminated to reduce the region B to the minimum necessary range. Accordingly, an electrical connection line for charging and discharging the solid state battery 1000α can be formed more efficiently.

Furthermore, in this case, the region B can be reduced the minimum necessary range on the side corresponding to the end-face electrode facing region 102α of the battery element 100α, and the range of the region A (a facing region where the battery element 100α and the insulating buffer layer 200α directly face each other between the battery element 100α and the end-face electrode 300α) can be thus relatively further increased. As a result, the range of allowing "the prevention of the end-face electrode 300α peeled off" can be further increased, and the range of allowing the prevention of damage to the end surface 101α of the battery element 100 in the end-face electrode facing region 102α can be thus further increased.

[Method of Manufacturing Solid State Battery According to Present Invention]

A method for manufacturing the solid state battery according to an embodiment of the present invention will be described below.

The solid state battery according to an embodiment of the present invention can be manufactured by using a green sheet method mainly with a green sheet used. According to an aspect, with a predetermined staked body formed by a green sheet method, the solid state battery according to an embodiment of the present invention can be then finally manufactured. It is to be noted that the method will be described below on the premise of the aspect, but is not limited thereto, and the predetermined stacked body may be formed by a screen printing method, a composite method thereof, or the like.

(Step of Forming Unfired Stacked Body)

First, each substrate (for example, a PET film) is coated with a solid electrolyte layer paste, a positive electrode material layer paste, a positive electrode current collector layer paste, a negative electrode material layer paste, a negative electrode current collector layer paste, an insulating part paste, and a protective layer paste.

Each paste can be prepared by wet-mixing a predetermined constituent material for each layer appropriately selected from the group consisting of a positive electrode active material, a negative electrode active material, a conductive material, a solid electrolyte material, an insulating material, and a sintering aid, with an organic vehicle that has an organic material dissolved in a solvent. The positive electrode material layer paste includes, for example, a positive electrode active material, a conductive material, a solid electrolyte material, an organic material, and a solvent. The negative electrode material layer paste includes, for example, a negative electrode active material, a conductive material, a solid electrolyte material, an organic material, and a solvent. The positive electrode current collector layer paste/negative electrode current collector layer paste may have, for example, at least one selected from the group consisting of silver, palladium, gold, platinum, aluminum, copper, and nickel. The solid electrolyte layer paste includes, for example, a solid electrolyte material, a sintering aid, an organic material, and a solvent. The protective layer paste includes, for example, an insulating material, an organic material, and a solvent. The insulating part paste includes, for example, an insulating material, an organic material, and a solvent.

In the wet mixing, a medium can be used, and specifically, a ball mill method, a Viscomill method, or the like can be used. In contrast, a wet mixing method without a medium used may be used, and a sand mill method, a high-pressure homogenizer method, a kneader dispersion method, and the like can be used.

A predetermined solid electrolyte layer paste can be prepared by wet-mixing a predetermined solid electrolyte material, a sintering aid, and an organic vehicle that has an organic material dissolved in a solvent. Further, as described already, examples of the solid electrolyte include lithium-containing phosphate compounds that have a NASICON structure, oxides that have a perovskite structure, and oxides that have a garnet-type or garnet-type similar structure. Examples of the lithium-containing phosphate compound that has a NASICON structure include $Li_xM_y(PO_4)_3$ ($1 \le x \le 2$, $1 \le y \le 2$, M is at least one selected from the group consisting of Ti, Ge, Al, Ga, and Zr). Examples of the lithium-containing phosphate compounds that have a NASICON structure include $Li_{1.2}Al_{0.2}Ti_{1.8}(PO_4)_3$. Examples of the oxides that have a perovskite structure include $La_{0.55}Li_{0.35}TiO_3$. Examples of the oxides that have a garnet-type or garnet-type similar structure include $Li_7La_3Zr_2O_{12}$.

As the positive electrode active material included in the positive electrode active material layer paste, at least one is selected from the group consisting of lithium-containing phosphate compounds that have a NASICON-type structure, lithium-containing phosphate compounds that have an olivine-type structure, lithium-containing layered oxides, and lithium-containing oxides that have a spinel-type structure.

The insulating material included in the insulating part paste can be made of, for example, a glass material, a ceramic material, or the like. As the insulating material included in the protective layer paste, for example, it is preferable to use at least one selected from the group consisting of, for example, a glass material, a ceramic material, a thermosetting resin material, a photocurable resin material, and the like.

The organic material included in the paste is not particularly limited, but at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The solvent is not particularly limited as long as the organic material can be dissolved therein, and for example, toluene and/or ethanol can be used.

As the negative electrode active material included in the negative electrode material layer paste, at least one is selected from the group consisting of, for example, oxides containing at least one element selected from the group consisting of Ti, Si, Sn, Cr, Fe, Nb, and Mo, graphite-lithium compounds, lithium alloys, lithium-containing phosphate compounds that have a NASICON-type structure, lithium-containing phosphate compounds that have an olivine-type structure, lithium-containing oxides that have a spinel-type structure, and the like.

The sintering aid can be at least one selected from the group consisting of lithium oxides, sodium oxides, potassium oxides, boron oxides, and silicon oxides.

The applied pastes are dried on a hot plate heated to 30 to 50° C. to form, on the substrate (for example, a PET film), each of a solid electrolyte layer sheet that has a predetermined thickness, a positive electrode layer sheet including a positive electrode material layer, a negative electrode layer sheet including a negative electrode material layer, and a protective layer sheet.

Next, each sheet is peeled off from the substrate. After the peeling, the sheets for the respective constituent elements of the battery constituent unit are sequentially stacked in the stacking direction.

In the stacking step, a solid electrolyte part sheet or an insulating part sheet is provided by screen printing in a side region of the electrode sheets. Specifically, the solid electrolyte part sheet or the insulating part sheet is provided so as to surround an end-face electrode non-connection part of the side part of the electrode sheet excluding a part to which an end-face electrode is connected later.

It is then preferable to perform thermal compression bonding at a predetermined pressure (for example, from about 50 MPa to about 100 MPa) followed by isostatic press at a predetermined pressure (for example, from about 150 MPa to about 300 MPa). As described above, a predetermined unfired stacked body can be formed.

(Step of Applying Insulating Material)

After forming the predetermined unfired stacked body, an insulating material is provided on the surface of the unfired stacked body. Specifically, the insulating material is applied continuously to the surface of the unfired stacked body, which does not face the end-face electrodes to be disposed later. In contrast, the insulating material is provided intermittently to the surface of the unfired stacked body, which is intended to face the end-face electrodes to be disposed later.

The material provided on the surface of the unfired stacked body is preferably a material that has an insulating property, has a heat-resisting temperature of 300 degrees or higher and 900 degrees or lower, and is, also under the high-temperature condition, capable of maintaining a low friction coefficient (μ) of 0.2 or less in the atmosphere without being oxidized. For this reason, the insulating material provided to the surface of the unfired stacked body is preferably at least one material selected from the group consisting of a boron nitride, a molybdenum sulfide, and a tungsten sulfide. Examples of the method for intermittently providing the insulating material include spray coating and intermittent coating. As described above, the unfired stacked body with the insulating material is obtained, with the insulating material intermittently applied to the surface intended to face the end-face electrodes.

(Firing Step)

Next, the unfired stacked body with the insulating material is subjected to firing. The firing is performed by applying a pressure to the unfired stacked body with the insulating material with the use of a heated mold. As the mold used for applying the pressure, for example, a mold heated at 100° C. or higher and 250° C. or lower, for example, 200° C. is used. As described above, a fired laminated body can be formed. If necessary, a step of dividing the fired laminated body into pieces may be further added.

(Step of Forming End Face Electrode)

Next, the end-face electrodes are formed on the surface of the fired laminated body so as to directly face the part with the insulating material provided intermittently. More specifically, the end-face electrodes are formed so as to be located on the part with the insulating material provided intermittently. Although not particularly limited, the end-face electrodes are preferably made of at least one selected from silver, gold, platinum, aluminum, copper, tin, and nickel.

The end-face electrode on the positive electrode side can be formed by a dry plating method such as physical vapor deposition (PVD) or chemical vapor deposition (CVD) onto the positive electrode layer exposed side surface of the fired laminated body. Examples of the physical vapor deposition method (PVD) include a vacuum deposition method and a sputtering method (in particular, an ion beam sputtering method). Examples of the chemical vapor deposition method (CVD) include a thermal CVD method and a plasma CVD method. Similarly, the end-face electrode on the negative electrode side can be formed by the dry plating method mentioned above onto the negative electrode layer exposed side surface of the fired laminated body.

Without being limited thereto, the end-face electrodes can be formed by applying conductive pastes to the electrode exposed side surfaces of the fired laminated body and then making the pastes sintered. Further, the end-face electrodes on the positive electrode side and negative electrode side can be performed not only after firing the stacked body but also before the firing and simultaneously with the firing. In addition, the end surface electrodes can be typically formed with the use of a mask in the method mentioned above. For example, the end-face electrodes can be formed on a part other than the part hidden by the mask with the use of an ion beam sputtering apparatus.

(Step of Forming Lower Surface Electrode)

After the formation of the end electrodes, lower electrodes are formed. Specifically, the lower surface electrode on the positive electrode side can be formed by, for example, the dry plating method mentioned above, so as to be electrically connected to the end-face electrode on the positive electrode side. Similarly, the lower surface electrode on the negative electrode side can be formed by, for example, the dry plating method mentioned above, so as to be electrically connected to the end-face electrode on the negative electrode side.

Without being limited thereto, the lower surface electrode on the positive electrode side can be formed by applying a conductive paste and then making the paste sintered. Similarly, the lower surface electrode on the negative electrode side can be formed by applying a conductive paste and then making the paste sintered. The lower surface electrodes can be formed can be formed with the use of a mask in the method mentioned above. For example, the lower surface electrodes can be formed on a part other than the part hidden by the mask with the use of an ion beam sputtering apparatus.

(Step of Forming Covering Layer)

After the formation of the lower surface electrodes, a covering layer is formed so as to cover the fired laminated body with the end-face electrodes. The formation of the covering layer is not to be considered limited to after the formation of the lower surface electrodes, and may be performed before the formation of the lower surface electrodes. Such a covering layer can be composed of multiple layers. The formation of the covering layer allows a packaged solid state battery to be obtained. The "packaging" means, in a broad sense, a step of protecting the solid state battery from the external environment, and in a narrow sense, an action of forming a covering layer such that water vapor in the external environment does not enter the inside of the solid state battery.

The methods for forming the respective layers are not to be considered particularly limited, but an interface layer can be formed, for example, by applying a coating liquid for the interface layer and drying the coating liquid. The barrier layer can be formed, for example, by applying a coating liquid for the barrier layer and drying the coating liquid, or can also be formed by the dry plating method mentioned above. The buffer layer can be formed, for example, by applying a coating liquid for the buffer layer and drying the coating liquid. The impact resistant layer can be formed, for example, by applying a coating liquid for the impact resistant layer and drying the coating liquid. The embodiments of applying the coating liquids can be carried out by various methods. Examples thereof include a dip coating method, a brush coating method, a blade coating method, a wire bar coating method, a spray coating method, a bead coating method, an air knife coating method, and a curtain coating method.

As described above, the solid state battery according to an embodiment of the present embodiment can be obtained (see FIGS. 1 and 2). As described above in the section of the Feature of Solid State Battery according to Present Invention, the obtained solid state battery 1000 includes the insulating buffer layer 200. The insulating buffer layer 200 is located between the covering layer 400 and the battery element 100 and provided so as to surround the end surface of the battery element 100. In such a configuration, in the obtained solid state battery 1000, in particular, the insulating buffer layer 200 positioned on the side corresponding to an end-face electrode facing region 102 of the battery element 100 is sandwiched between the battery element 100 and the end-face electrode 300 and provided intermittently.

Such an intermittent disposition of the insulating buffer layer 200 results in the formation of, on the side corresponding to the end-face electrode facing region 102, (1) the region where the insulating buffer layer 200 is positioned between the battery element 100 and the end-face electrode 300 and (2) the region where the insulating buffer layer 200 is not positioned between the battery element 100 and the end-face electrode 300.

In (1) the region where the insulating buffer layer 200 is positioned, the insulating buffer layer 200 is, because of its buffering property, capable of receiving the expanding and shrinking battery element 100, while relaxing the stress caused by the expansion and shrinkage of the battery element 100. As a result, the end-face electrode 300 peeled is suitably avoided, thereby allowing damage to the end-face electrode facing region 102 of the end surface of the battery element 100 to be suitably avoided. In contrast, in (2) the region where the insulating buffer layer 200 is not positioned, the battery element 100 and the end-face electrode 300 are allowed to directly face each other. As a result, contact between the electrode layer 10 and the end-face electrode 300 is suitably allowed to be secured, thereby allowing for securing an electrical connection line for suitably charging and discharging the solid state battery 1000.

Furthermore, in the end-face electrode non-facing region 103 other than the end-face electrode facing region 102 that is a constituent element of the end surface 101 of the battery element 100, the insulating buffer layer 200 is positioned between the region 103 and the covering layer 400. The insulating buffer layer 200 functions as a stress relaxing layer, thereby allowing for avoiding the covering layer 400 peeled from the end-face electrode non-facing region 103 at the time of charging and discharging the battery.

Also from the foregoing, in the obtained solid state battery 1000, contact between the electrode layer 10 and the end-face electrode 300 can be also suitably secured while suppressing the generation of damage to the end surface 101 of the battery element 100 as a whole.

EXAMPLES

Hereinafter, examples of the present invention will be described.

Comparative Example (Without Insulating Buffer Layer)

Manufactured as a solid state battery was a battery including a battery element, end-face electrodes provided in direct contact with the end surface of the battery element without any insulating buffer layer (that is, insulating member) provided, and a covering layer provided so as to cover the battery element with the end-face electrodes. After the manufacture, the solid state battery was charged and discharged, the solid state battery was then polished, the condition of the battery element and covering layer was then checked. Specifically, whether the covering layer was peeled off from the battery element or not was checked. As a result, the covering layer peeled from the end surface of the battery element was observed.

Example

Example (With Insulating Buffer Layer)

Manufactured as a solid state battery was a battery including a battery element, end-face electrodes provided so as to face the end surface of the battery element, a covering layer provided so as to cover the battery element with the end-face electrodes, and an insulating buffer layer located between the covering layer and the battery element and provided so as to surround the battery element. In particular, according to the present example, the insulating buffer layer was disposed so as to be sandwiched between the battery element and the end-face electrodes and provided intermittently on the end-face electrode facing region side of the end surface of the battery element. After the manufacture, the solid state battery was charged and discharged, the solid state battery was then polished, the condition of the battery element and covering layer was then checked. Specifically, whether the covering layer was peeled off from the battery element or not was checked.

As a result, it has been determined that the covering layer is kept from being peeled from the end surface of the battery element. Thus, it has been determined that the generation of damage to the end surface of the battery element can be suppressed in addition to the contact secured between electrode layers and the end-face electrodes by the intermittent disposition of the insulating buffer layer. More specifically, it has been determined that it is possible to achieve a balance between the contact secured between the electrode layers and the end-face electrodes and the suppressed generation of damage to the end surface of the battery element.

Experimental Example 1

Specifically, the insulating material between the battery element and the end-face electrodes was prepared such that the ratio ([%]) of the area of the insulating material formed to the total area of the electrode layers located at the end surface (corresponding to the end-face electrode facing region) of the battery element was 0.2% (more than 0.1%). As a result, it has been determined that the covering layer is kept from being peeled from the end surface of the battery element, specifically, the end-face electrode facing region of the battery element.

Experimental Example 2

The insulating material between the battery element and the end-face electrodes was prepared such that the ratio ([%]) of the area of the insulating material formed to the total area of the electrode layers located at the end surface (corresponding to the end-face electrode facing region) of the battery element was 90% (less than 95%). As a result, it has been determined that the covering layer is kept from being peeled from the end surface of the battery element, specifically, the end-face electrode facing region of the battery element.

Experimental Example 3

The insulating material between the battery element and the end-face electrodes was prepared such that the ratio ([%]) of the area of the insulating material formed to the total area of the electrode layers located at the end surface (corresponding to the end-face electrode facing region) of the battery element was 0.5%. As a result, the covering layer peeled from the end surface of the battery element, specifically, the end-face electrode facing region of the battery element was not observed when the ratio ([%]) of the area of the insulating material formed was 0.5%.

Figure 5:
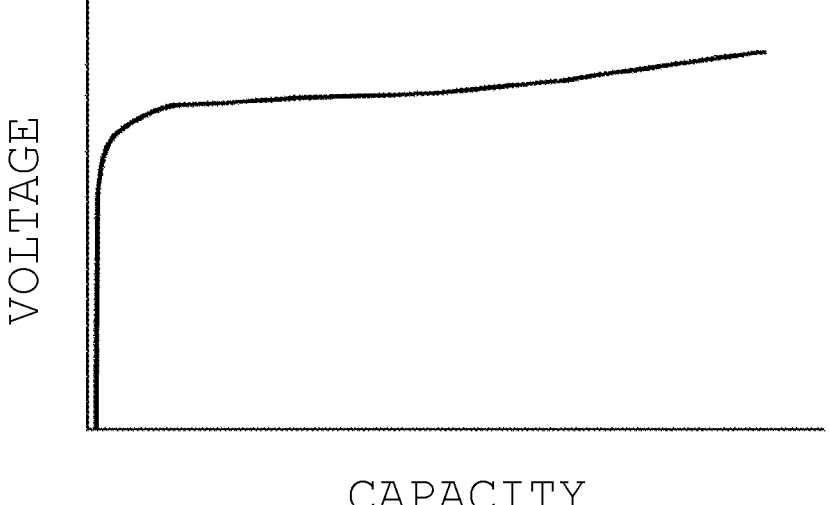
FIG. 5 is a graph showing a voltage-capacity curve in Experimental Example 3.

Furthermore, it has been determined that the suitable contact between the end surface of the battery element, specifically, the end-face electrode facing region of the battery element and the end-face electrode stabilizes the voltage-capacity curve after charging and discharging the battery as shown in FIG. 5.

Experimental Example 4

The insulating material between the battery element and the end-face electrodes was prepared such that the ratio ([%]) of the area of the insulating material formed to the total area of the electrode layers located at the end surface (corresponding to the end-face electrode facing region) of the battery element was 50%. As a result, the covering layer peeled from the end surface of the battery element, specifically, the end-face electrode facing region of the battery element was also not observed when the ratio ([%]) of the area of the insulating material formed was 50%. Furthermore, it has been determined that the suitable contact between the end surface of the battery element, specifically, the end-face electrode facing region of the battery element and the end-face electrode stabilizes the voltage-capacity curve after charging and discharging the battery as in the case shown in FIG. 5.

Experimental Example 5

The insulating material between the battery element and the end-face electrodes was prepared such that the ratio ([%]) of the area of the insulating material formed to the total area of the electrode layers located at the end surface (corresponding to the end-face electrode facing region) of the battery element was 75%. As a result, the covering layer peeled from the end surface of the battery element, specifically, the end-face electrode facing region of the battery element was also not observed when the ratio ([%]) of the area of the insulating material formed was 0.5%. Furthermore, it has been determined that the suitable contact between the end surface of the battery element, specifically, the end-face electrode facing region of the battery element and the end-face electrode stabilizes the voltage-capacity curve after charging and discharging the battery as in the case shown in FIG. 5.

Also from the foregoing, it has been determined that, regarding the insulating material between the battery element and the end-face electrodes, as long as the ratio of the area of the insulating material formed to the total area of the electrode layers located in the end-face electrode facing region is more than 0.1% and less than 95%, specifically, 0.2% to 90%, it is possible to achieve a balance between "the prevention of the end-face electrodes peeled off" and "contact secured between the battery element and the end-face electrodes". Furthermore, it has been determined that as long as the ratio of the area of the insulating material formed is preferably 0.5% to 75%, the voltage-capacity curve after charging and discharging the battery is more stabilized in addition to achieving a balance between "the prevention of the end-face electrodes peeled off" and "contact secured between the battery element and the end-face electrodes".

Further, it has been determined that a molybdenum sulfide or a tungsten sulfide can be also used instead of a boron nitride as the insulating material in the present example. This is because these materials are materials that have an insulating property, has a heat-resisting temperature of 300 degrees or higher and 900 degrees or lower, and is, also under the high-temperature condition, capable of maintaining a low friction coefficient ($\mu$) of 0.2 or less in the atmosphere without being oxidized.

While an embodiment of the present invention has been described above, a typical example in the applicable scope of the present invention has been merely provided. Accordingly, a person skilled in the art will easily understand that the present invention is not limited thereto, and various modifications can be made.

The solid state battery according to an embodiment of the present invention can be used in various fields in which power storage is expected. By way of example only, the solid state battery according to an embodiment of the present invention can be used in electric, information, and communication fields (for example, the fields of mobile devices such as cellular phones, smartphones, smartwatches, lap-top computers, digital cameras, activity meters, arm computers, and electronic papers) in which a mobile device or the like is used, home and small-size industrial applications (for example, the fields of electric tools, golf carts, domestic and nursing care, and industrial robots), large-size industrial applications (for example, the fields of forklifts, elevators, harbor cranes), transportation system fields (for example, fields such as hybrid vehicles, electric vehicles, buses, trains, power-assisted bicycles, and electric motorcycles), electric power system applications (for example, fields such as various types of electric power generation, load conditioners, smart grids, general household installation-type power storage systems), medical applications (fields of medical device such as earphone hearing aids), pharmaceutical applications (fields such as dosage management systems), IoT fields, space and deep-sea applications (for example, fields such as spacecraft and submersible research vehicles), and the like.

DESCRIPTION OF REFERENCE SYMBOLS

10, 10α: Electrode layer
10A, 10Aα: Positive electrode layer
10B, 10Bα: Negative electrode layer
20, 20α: Solid electrolyte layer
100, 100α: Battery element
101, 101α: End surface of battery element
102, 102α: End-face electrode facing region of battery element
103, 103α: End-face electrode non-facing region of battery element
200, 200α: Insulating buffer layer
300, 300α: End-face electrode
400, 400α: Covering layer
500, 500α: Lower surface electrode
1000, 1000α: Solid state battery
A: Facing region where battery element and the insulating buffer layer directly face each other between battery element and end-face electrode
B: Non-facing region where battery element and the insulating buffer layer do not face each other between battery element and end-face electrode

The invention claimed is:
1. A solid state battery comprising:
a battery element comprising a positive electrode layer, a negative electrode layer, and a solid electrolyte layer interposed between the positive electrode layer and the negative electrode layer;
an end-face electrode facing an end surface of the battery element;
a covering layer covering the battery element with the end-face electrode; and
an insulating buffer layer between the covering layer and the battery element and surrounding the battery element, wherein the insulating buffer layer is also sandwiched between the battery element and the end-face electrode and arranged intermittently on an end-face electrode facing region side of the end surface of the battery element.
2. The solid state battery according to claim 1, wherein the insulating buffer layer is in contact with at least the battery element.

3. The solid state battery according to claim 1, wherein the insulating buffer layer defines a facing region where the battery element and the insulating buffer layer directly face each other and a non-facing region where the battery element and the insulating buffer layer do not face each other between the battery element and the end-face electrode.

4. The solid state battery according to claim 3, wherein the facing region and the non-facing region alternate between the battery element and the end-face electrode.

5. The solid state battery according to claim 1, wherein the intermittent arrangement of the insulating buffer layer forms a part where at least one electrode layer of the positive electrode layer and the negative electrode layer and the end-face electrode directly face each other.

6. The solid state battery according to claim 1, wherein the intermittent arrangement of the insulating buffer layer forms a part where only one electrode layer of the positive electrode layer and the negative electrode layer and the end-face electrode directly face each other.

7. The solid state battery according to claim 1,
wherein the battery element has a substantially rectangular parallelepiped shape, and
the insulating buffer layer directly faces an upper surface, a lower surface, and side surfaces constituting the end surface of the battery element in the substantially rectangular parallelepiped shape.

8. The solid state battery according to claim 1, wherein a ratio of an area of the insulating buffer layer to a total area of at least one electrode layer of the positive electrode layer and the negative electrode layer located at the end surface of the battery element is more than 0.1% and less than 95% between the battery element and the end-face electrode.

9. The solid state battery according to claim 8, wherein the ratio is 0.5% to 75%.

10. The solid state battery according to claim 1, wherein the insulating buffer layer has a heat-resisting temperature of 300 degrees or higher and 900 degrees or lower.

11. The solid state battery according to claim 1, wherein the insulating buffer layer is made of at least one material selected from the group consisting of a boron nitride, a molybdenum sulfide, and a tungsten sulfide.

12. The solid state battery according to claim 1, wherein the insulating buffer layer is a stress relaxing layer.

13. The solid state battery according to claim 1, wherein the covering layer comprises a water vapor barrier layer.

14. The solid state battery according to claim 13, wherein the water vapor barrier layer has a water vapor permeation rate of $1.0 \times 10^{-2}$ g/(m$^2 \cdot$Day) or less.

15. The solid state battery according to claim 1, wherein the positive electrode layer and the negative electrode layer are layers capable of occluding and releasing lithium ions.

16. A method for manufacturing a solid state battery, the method comprising:
stacking a positive electrode layer sheet, a solid electrolyte layer sheet, and a negative electrode layer sheet in a stacking direction to form an unfired stacked body;
providing an insulating material intermittently on a surface of the unfired stacked body;
firing the unfired stacked body with the insulating material to form a fired laminated body;
providing an end-face electrode on a surface of the fired laminated body having the intermittent insulating material; and
forming a covering layer to cover the fired laminated body with the end-face electrode.

17. The method for manufacturing a solid state battery according to claim 16, wherein a ratio of an area of the insulating buffer layer to a total area of at least one electrode layer of the positive electrode layer and the negative electrode layer located at the end surface of the battery element is more than 0.1% and less than 95% between the battery element and the end-face electrode.

18. The method for manufacturing a solid state battery according to claim 17, wherein the ratio is 0.5% to 75%.

19. The method for manufacturing a solid state battery according to claim 16, wherein the insulating buffer layer has a heat-resisting temperature of 300 degrees or higher and 900 degrees or lower.

20. The method for manufacturing a solid state battery according to claim 16, wherein the insulating buffer layer is made of at least one material selected from the group consisting of a boron nitride, a molybdenum sulfide, and a tungsten sulfide.

* * * * *